US012184621B2

(12) United States Patent
Swoboda et al.

(10) Patent No.: US 12,184,621 B2
(45) Date of Patent: Dec. 31, 2024

(54) METHOD AND APPARATUS FOR AUTHENTICATING ENCRYPTED COMMUNICATION

(71) Applicant: Eleven-X Incorporated, Waterloo (CA)

(72) Inventors: Jonathan Swoboda, Waterloo (CA); Alan Sung, Waterloo (CA); Won Huh, Waterloo (CA)

(73) Assignee: Eleven-X Incorporated (CA)

( * ) Notice: Subject to any disclaimer, the term of this patent is extended or adjusted under 35 U.S.C. 154(b) by 257 days.

(21) Appl. No.: 17/808,867

(22) Filed: Jun. 24, 2022

(65) Prior Publication Data
US 2022/0417224 A1 Dec. 29, 2022

Related U.S. Application Data

(60) Provisional application No. 63/215,071, filed on Jun. 25, 2021.

(51) Int. Cl.
*H04L 9/40* (2022.01)
*H04W 4/80* (2018.01)
(Continued)

(52) U.S. Cl.
CPC ........ *H04L 63/0428* (2013.01); *H04L 63/162* (2013.01); *H04W 4/80* (2018.02); *H04W 12/06* (2013.01); *H04W 76/14* (2018.02)

(58) Field of Classification Search
None
See application file for complete search history.

(56) References Cited

U.S. PATENT DOCUMENTS

| 9,699,814 B2 | 7/2017 | Zakaria et al. |
| 10,091,242 B2 | 10/2018 | Britt et al. |

(Continued)

FOREIGN PATENT DOCUMENTS

| WO | WO-2017003379 A1 * | 1/2017 | ............ G06F 21/35 |
| WO | 2017205770 A1 | 11/2017 | |
| WO | 2020205514 A1 | 10/2020 | |

OTHER PUBLICATIONS

Bon, Matthew, "A Basic Introduction to BLE 4.x Security", modified Oct. 25, 2016, 8 pages <https://forum.digikey.com/t/a-basic-introduction-to-ble-4-x-security/12501>.

(Continued)

*Primary Examiner* — Joseph P Hirl
*Assistant Examiner* — Hassan Saadoun
(74) *Attorney, Agent, or Firm* — DENTONS DAVIS BROWN PC; Matthew Warner-Blankenship

(57) ABSTRACT

Disclosed is a method for execution by a computing device. The method involves establishing a communication channel for communicating with a client device using link-layer encryption, and attempting to authenticate the client device using authentication-layer encryption on top of the link-layer encryption. The method also involves receiving a command from the client device over the communication channel, and if the client device has been authenticated, executing the command. Notably, the link-layer encryption offers some degree of security because network traffic over the communication channel is encrypted, but does not offer adequate protection from all cyber attacks. However, the authentication-layer encryption adds an additional layer of security on top of the link-layer encryption, which can help to avoid or mitigate cyber attacks. In this way, it is possible to avoid or mitigate unauthorized users from having the (Continued)

computing device execute commands, because security is enhanced beyond the link-layer encryption.

19 Claims, 7 Drawing Sheets

(51) Int. Cl.
*H04W 12/06* (2021.01)
*H04W 76/14* (2018.01)

(56) References Cited

U.S. PATENT DOCUMENTS

| | | | |
|---|---|---|---|
| 10,271,728 B2 | 4/2019 | Melodia et al. | |
| 10,275,581 B2 | 4/2019 | Yoon et al. | |
| 10,382,203 B1 | 8/2019 | Loladia et al. | |
| 10,419,930 B2 | 9/2019 | Holland et al. | |
| 10,524,119 B2 | 12/2019 | Altin et al. | |
| 10,681,544 B2 | 6/2020 | Luo et al. | |
| 10,693,969 B2 | 6/2020 | Cho et al. | |
| 10,708,777 B2 | 7/2020 | Kim et al. | |
| 10,841,759 B2 | 11/2020 | Bartlett et al. | |
| 10,873,465 B2 | 12/2020 | Meriac et al. | |
| 10,972,912 B1 | 4/2021 | Krishnamoorthy et al. | |
| 11,358,565 B1* | 6/2022 | Xie | G07C 9/00309 |
| 2006/0104282 A1* | 5/2006 | Madour | H04W 12/06 370/395.2 |
| 2016/0212194 A1 | 7/2016 | Palin et al. | |
| 2018/0255457 A1* | 9/2018 | Vedantham | H04L 63/0428 |
| 2019/0044737 A1 | 2/2019 | Singhi et al. | |
| 2019/0349426 A1 | 11/2019 | Smith et al. | |
| 2020/0070773 A1* | 3/2020 | Gennermann | H04W 12/06 |
| 2020/0169549 A1 | 5/2020 | Smith | |
| 2020/0236088 A1 | 7/2020 | Karkkainen et al. | |
| 2020/0250896 A1* | 8/2020 | Vossoughi | H04W 4/24 |
| 2020/0314263 A1* | 10/2020 | Sumita | H04W 76/14 |
| 2021/0203491 A1 | 7/2021 | Wei et al. | |
| 2021/0306311 A1* | 9/2021 | Chifor | H04L 63/162 |

OTHER PUBLICATIONS

Fisher et al., "Security for Building Automation with Hardware-Based Node Authentication", Proceedings of the 2017 22nd IEEE International Conference on Emerging Technologies and Factory Automation (ETFA), Limassol, Cyprus, IEEE Press, Sep. 12, 2017, 6 pages.

Rehman et al., "Security and privacy issues IoT", International Journal of Communication Networks and Information Security (IJCNIS), vol. 8, No. 3, Hamdard Institute of Engineering and Technology, Faculty of Engineering Science and Technology, Hamdard University, Karachi, Pakistan, Nov. 2016, 12 pages.

Abomhara et al., "Security and privacy in the Internet of Things: Current status and open issues", Proceedings of the 2014 International Conference on Privacy and Security in Mobile Systems (PRISMS), Aalborg, Denmark, IEEE Press, May 14, 2014, 8 pages.

International Search Report and Written Opinion for International Application No. PCT/CA2022/051023 dated Sep. 27, 2022, 17 pages.

* cited by examiner

METHOD AND APPARATUS FOR AUTHENTICATING ENCRYPTED COMMUNICATION

RELATED APPLICATION

This patent application claims priority to U.S. Provisional Patent Application No. 63/215,071 filed on Jun. 25, 2021, the entire disclosure of which is incorporated by reference.

FIELD OF THE DISCLOSURE

This disclosure relates to encrypted communication, and more particularly to communication protocols that use link-layer encryption.

BACKGROUND

A communication channel that uses link-layer encryption can be established between a client device and a computing device using a communication protocol such as BLE (Bluetooth Low Energy). The link-layer encryption offers some degree of security because network traffic over the communication channel is encrypted.

BLE is a wireless communication protocol. A significant difference between traditional Bluetooth technology and BLE technology is power consumption. BLE can send small packets of data intermittently in intervals and can enable a sleep mode unless activated. This can reduce power consumption and consequently increases battery life of computing devices that are battery powered. BLE technology has been widely used for several IoT (Internet of Things) applications such as wearable devices, blood pressure monitors, public transportation devices, etc. There are numerous pairing methods to establish BLE connections, Just Works and Passkey being the most common ones.

Passkey pairing involves sharing a six-digit static or random key to establish a connection, but it is severely prone to eavesdropping attacks. It is not suitable for applications where the computing device is easily accessible to everyone such as public spaces. For example, in a parking environment, it may be possible for anyone to easily access a parking sensor device. Additionally, static passkeys are common targets of brute force attacks. Devices can also generate a random passkey and display that information prior to establishing connection. This involves physical access to the computing device and it may provide some protection against unwanted access. However, as mentioned, it may be possible for anyone to connect to the computing device as long as they have physical access to the display. For example, public transport management applications, where the sensors/devices are usually accessible to public. If an attacker gains access to the computing device, he can run any command, change settings or even cripple the functioning of the computing device. Therefore, passkey pairing does not provide adequate protection from cyber attacks and is not recommended for IoT applications where sensitive data is involved.

Just Works connection allows devices to pair by exchanging short-term access keys. Devices trying to connect using Just Works generate a private and a public access key. Once the private key is validated, a connection is established. Usually the access keys and the data being transferred are encrypted using AES (Advanced Encryption Standard), which provides some level of protection from compromising attacks. Although the AES encryption increases security of BLE communication, it is not sufficient to protect sensitive information from passive eavesdropping, MITM (Man-In-The-Middle) attacks, and identity tracking. For instance, a Just Works connection offers no way of verifying the devices taking part in the connection and thus offers no protection against an MITM attack.

Communication protocols that use link-layer encryption, such as BLE, do not offer adequate protection from cyber attacks, especially when computing devices are accessible to attackers. It is desirable to improve the security of such communication protocols and to address the aforementioned shortcomings.

SUMMARY OF THE DISCLOSURE

Disclosed is a method for execution by a computing device. The method involves establishing a communication channel for communicating with a client device using link-layer encryption, and attempting to authenticate the client device using authentication-layer encryption on top of the link-layer encryption. The method also involves receiving a command from the client device over the communication channel, and if the client device has been authenticated, executing the command.

Notably, the link-layer encryption offers some degree of security because network traffic over the communication channel is encrypted, but does not offer adequate protection from all cyber attacks, especially when the computing device is accessible to attackers. However, the authentication-layer encryption adds an additional layer of security on top of the link-layer encryption, which can help to avoid or mitigate cyber attacks. In this way, it is possible to avoid or mitigate unauthorized users from having the computing device execute commands, because security is enhanced beyond the link-layer encryption.

In some implementations, attempting to authenticate the client device using authentication-layer encryption includes: transmitting random data over the communication channel to the client device; receiving encrypted data over the communication channel from the client device; decrypting the encrypted data using an encryption key to produce raw data; and verifying that the raw data includes the random data that was sent to the client device in which case the client device is authenticated.

In some implementations, the method further includes: receiving an authentication request from the client device over the communication channel; wherein the random data is transmitted in response to the authentication request.

In some implementations, the method further includes: determining a security level being requested out of a plurality of possible security levels based on the authentication request; wherein the plurality of possible security levels includes a first security level for routine commands and a second security level for restricted commands.

In some implementations, the random data that is sent to the client device is based on the security level being requested.

In some implementations, when the authentication request is for the first security level, the random data sent to the client device includes eight bytes of random data for encryption by the client device itself; and when the authentication request is for the second security level, the random data sent to the client device includes a string of random data for encryption by a secured server.

In some implementations, the method further includes, upon authenticating the client device, transmitting a response to the client device confirming access to the computing device.

In some implementations, the method further includes, upon executing the command, transmitting a response to the client device confirming the execution and/or indicating a result of the execution.

In some implementations, the method further includes, upon attempting to authenticate the client device, if the client device could not be authenticated, disconnecting the communication channel.

In some implementations, the method further includes disabling the communication channel for a defined time period if there is a defined number of unsuccessful sequential attempts to authenticate the client device.

In some implementations, the method further includes, upon expiry of a timeout period in which no command is received from the client device, disconnecting the communication channel.

In some implementations, the communication channel having link-layer encryption includes a BLE (Bluetooth Low Energy) connection.

In some implementations, establishing the BLE connection includes pairing with Just Works.

In some implementations, the computing device includes an IoT device.

In some implementations, the IoT device includes a parking sensor device.

Also disclosed is a non-transitory computer readable medium having recorded thereon statements and instructions that, when executed by a processor or an MCU (Microcontroller Unit) of a computing device, implement a method as summarized above.

Also disclosed is a computing device having a communication interface and control circuitry coupled to the communication interface and configured to implement a method as summarized above.

In some implementations, the computing device includes an IoT device.

In some implementations, the IoT device includes a parking sensor device.

In some implementations, the communication interface includes a BLE (Bluetooth Low Energy) radio, and the circuitry includes an MCU (Microcontroller Unit).

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
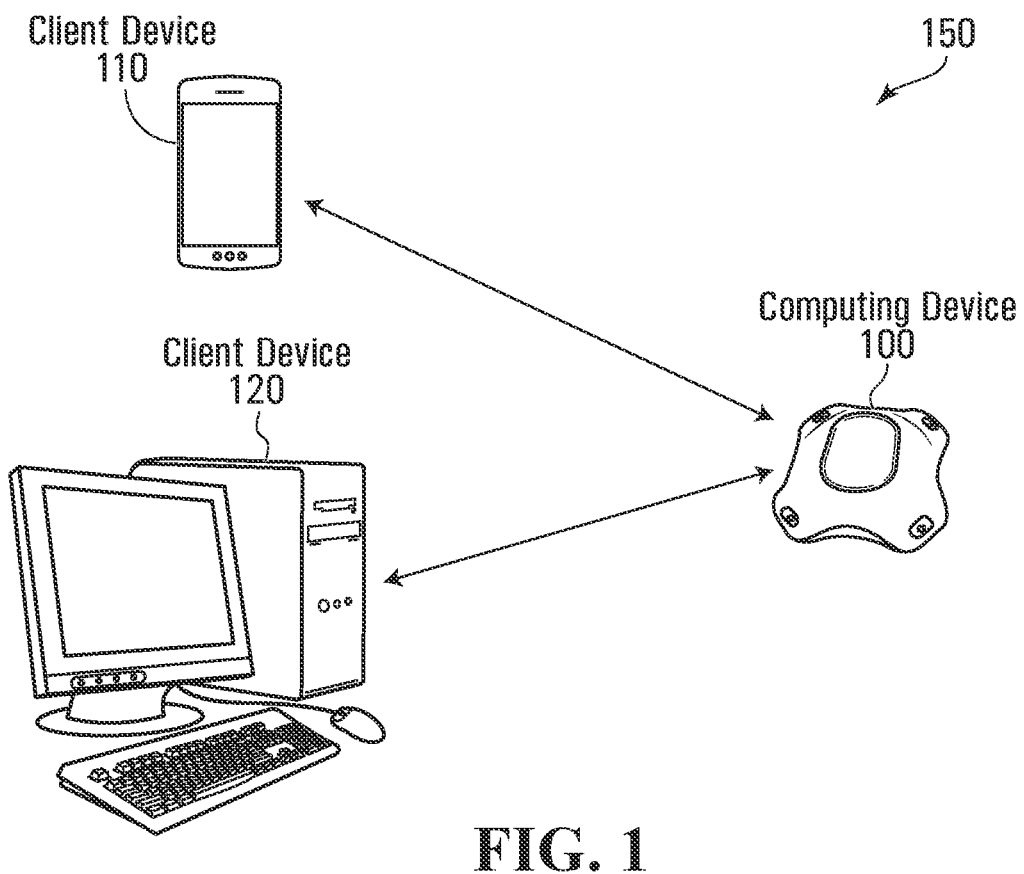
FIG. 1 is an example communication system having a computing device and one or more client devices.

Referring now to FIG. 1, shown is an example communication system 150 having a computing device 100 and one or more client devices 110 and 120. The one or more client devices can for example include a mobile phone 110 and a desktop computer 120 as shown, although other client devices are possible such as tablets, laptops, etc. In some implementations, the computing device 100 is a parking sensor device as shown and is configured to sense presence or absence of a vehicle in a defined area such as a parking space, although other implementations are possible including any suitable IoT (Internet of Things) device such as a wearable device, a smart home security device, etc. The computing device 100 is capable of establishing communication channels (e.g. BLE connections) with the client devices 110 and 120.

Figure 2:
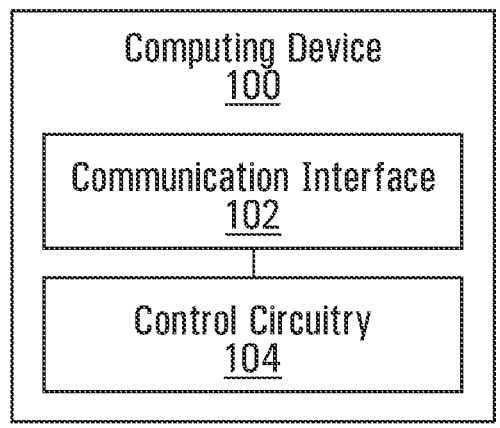
FIG. 2 is a block diagram of the computing device shown in FIG. 1.

Referring now to FIG. 2, shown is a block diagram of the computing device 100 shown in FIG. 1. The computing device 100 has a communication interface 102, control circuitry 104, and may have other components that are not specifically shown. The communication interface 102 can for example include a BLE radio for example. The control circuitry 104 is coupled to the communication interface 102 and is configured to authenticate a client device as described below. The control circuitry 104 can for example include a processor, an MCU (Microcontroller Unit), an FPGA (Field-Programmable Gate Array), an ASIC (Application-Specific Integrated Circuit), or any other appropriate circuitry.

Figure 3:
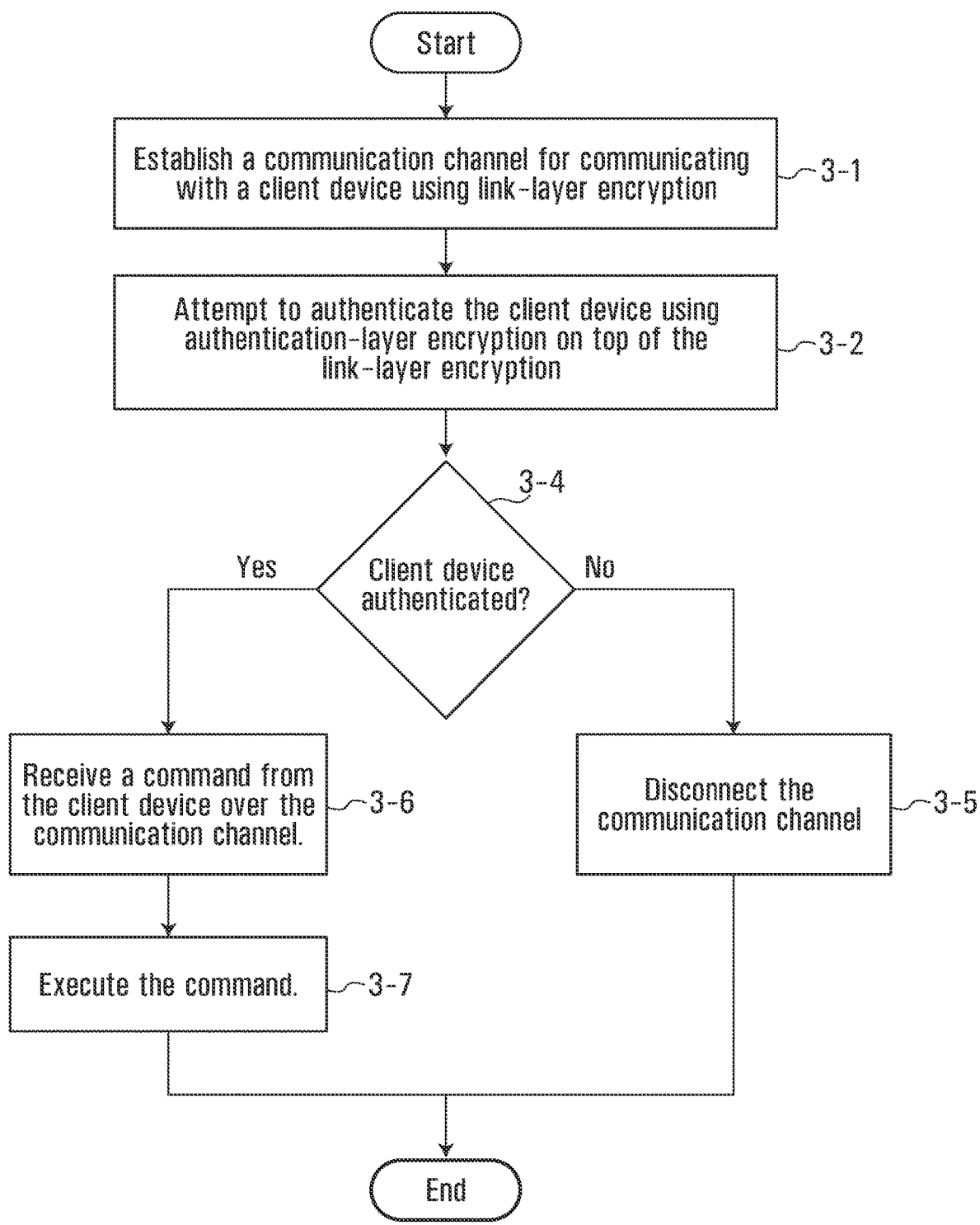
FIG. 3 is a flow chart of a method of authenticating a client device.

Operation of the computing device 100 will be described below with reference to FIG. 3, which is a flow chart of a method of authenticating a client device 110. Although the method of FIG. 3 is described below with reference to the computing device 100 and the client device 110 of FIGS. 1 and 2, it is to be understood that the method of FIG. 3 is applicable to other computing devices and other client devices. In general, the method of FIG. 3 is applicable to any appropriately configured computing device and any appropriately configured client device.

At step 3-1, the computing device 100 establishes a communication channel for communicating with the client device 110 using link-layer encryption. Note that the computing device 100 may be in a public area, such as a parking space for example, and hence there is some concern about unauthorized users trying to connect to the computing device 100 and have the computing device 100 execute commands. The link-layer encryption offers some degree of security because network traffic over the communication channel is encrypted, but does not offer adequate protection from cyber attacks, especially when the computing device 100 is accessible to attackers.

Therefore, at step 3-2, the computing device 100 attempts to authenticate the client device 110 using authentication-layer encryption on top of the link-layer encryption. This adds an additional layer of security on top of the link-layer encryption, which can help to avoid or mitigate cyber attacks. There are many ways that the authentication-layer encryption can be accomplished on top of the link-layer encryption. Examples are described below with reference to FIGS. 4 to 7.

If at step 3-4 the client device 110 has not been authenticated using the authentication-layer encryption, then at step 3-5 the computing device 100 disconnects the communication channel. This can help to prevent unauthorized users from having the computing device 100 execute commands, thereby helping to enhance security beyond the link-layer encryption.

However, if at step 3-4 the client device 110 has been authenticated using the authentication-layer encryption, then the computing device 100 can process commands from the client device 110. At step 3-6, the computing device 100 receives a command from the client device 110 over the communication channel, and at step 3-7 the computing device 100 executes the command because the client device 110 has been authenticated using the authentication-layer encryption.

Further example details of how a client device can be authenticated using the authentication-layer encryption are provided below with reference to various sequence diagrams. Although the sequence diagrams are described below with reference to the computing device 100 of FIGS. 1 and 2, it is to be understood that the sequence diagrams are applicable to other computing devices. In general, the sequence diagrams are applicable to any appropriately configured computing device Authentication According to an embodiment, a layer of authentication is added over an existing communication protocol that uses link layer encryption. The methods disclosed herein allow secure access/communication between a client device and a computing device over an existing communication protocol such as BLE for example. It can increase security of the existing communication protocol thereby protecting the computing device from compromising attacks. The methods disclosed herein do not require any new encryption method and hence can mitigate additional processing and power consumption while providing additional protection for the computing device.

In some implementations, multiple security levels are defined for the authentication layer, including a first security level and a second security level. The first security level provides the client device with basic level access to the computing device, whereas the second security level provides a debug level access to the computing device. The basic level access allows the client device to send a preliminary set of commands to the computing device such as viewing/editing basic settings of the device, viewing/changing reporting intervals, viewing firmware version, and shelf mode commands. The debug level access allows the client device to access advance settings of the computing device such as running diagnostics, clearing/changing sensor settings, upgrading/modifying firmware, erasing/reprogramming read only memory of the recipient etc.

A client device that is authenticated for the first security level obtains basic access rights to the computing device. Upon gaining basic level access, the client device can run general-purpose commands on the device, but would not be allowed to run any restricted command which could impact performance or impair functioning of the computing device unless they are authenticated for the second security level. If the client device is authenticated for the second security level, a debug level access is granted, thereby enabling the client device to run restricted commands on the device. Therefore, a dual-authentication method is disclosed that creates varying level of user rights. This can be useful as it allows companies to reserve critical commands that can affect functioning of the computing device (such as firmware upgrades, diagnostic settings etc.) for only restricted set of users, for example senior project managers or engineers who are responsible for/tasked with managing the computing device. For other users, including installers of the computing device, the first security level may be appropriate. Thus, two robust layers of authentication are added over existing protocols to regulate access to the computing device.

Authentication: First Security Level

Figure 4:
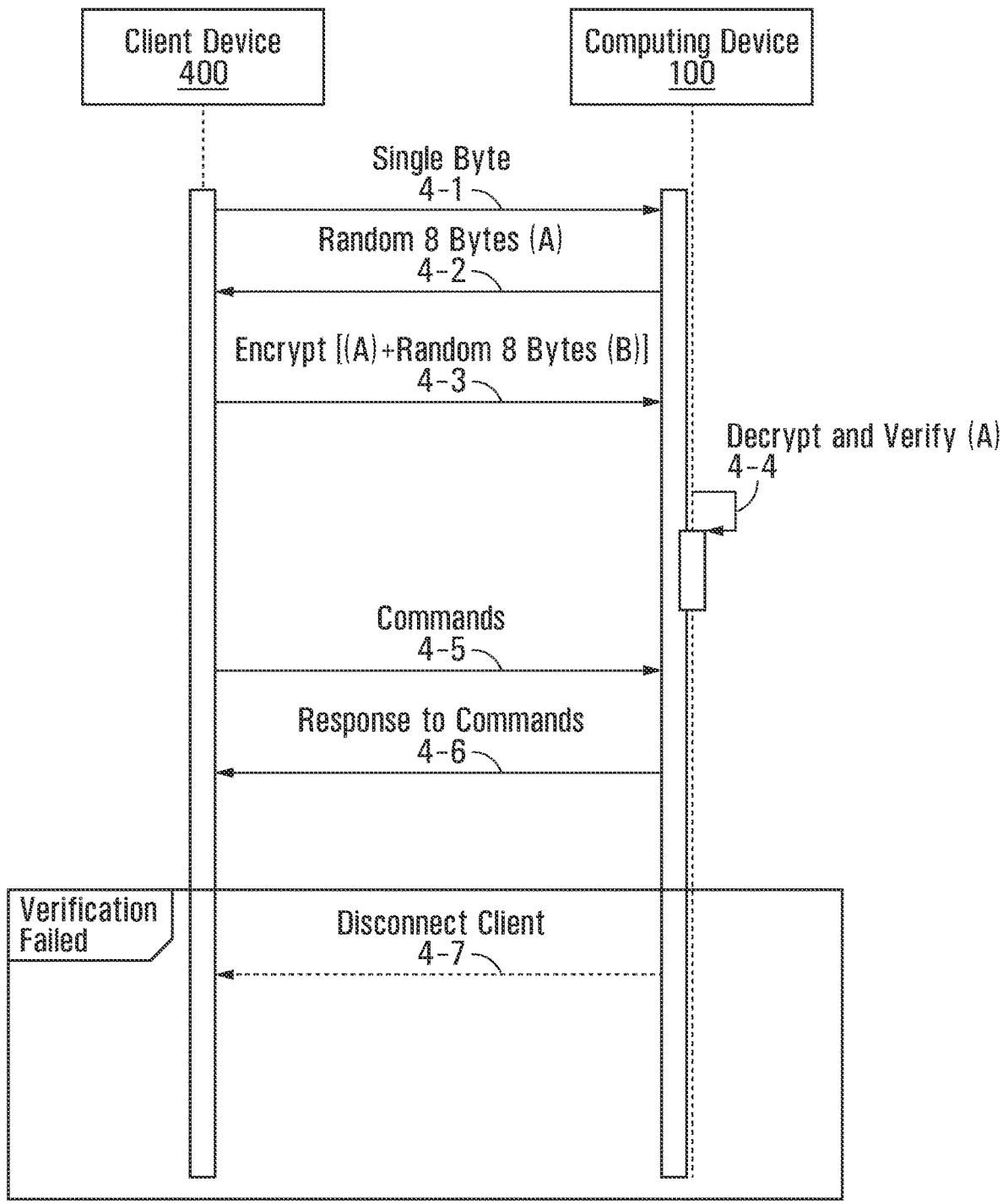
FIG. 4 is a sequence diagram showing how a client device is authenticated for a first security level.

Referring now to FIG. 4, shown is a sequence diagram showing how a client device 400 is authenticated for the first security level. It is to be understood that this sequence diagram is very specific for exemplary purposes only. In this sequence diagram, the client device 400 has already established a communication channel with the computing device 100. In some implementations, the communication channel is a BLE connection (e.g. Just Works). In other implementations, the communication channel may be established using some other communication protocol. Regardless, the communication channel has link-layer encryption.

Note that the computing device 100 may be in a public area, such as a parking space for example, and hence there is some concern about unauthorized users trying to connect to the computing device 100 and have the computing device 100 execute commands. Therefore, the computing device 100 attempts to authenticate the client device 400 using authentication-layer encryption on top of the link-layer encryption. This is described below.

In some implementations, as shown at step 4-1, the computing device 100 sends a single byte to the computing device 100 to initiate authentication. In some implementations, as shown at step 4-2, the computing device 100 sends eight random bytes to the client device 400. In some implementations, as shown at step 4-3, the client device 400 adds an additional eight random bytes to create a total of sixteen bytes, and these sixteen bytes are further encrypted using 128-bit AES encryption and sent to the computing device 100. At step 4-4, the computing device 100 decrypts the AES encryption and verifies if the eight bytes generated by the computing device 100 are as expected.

The creation of eight random bytes and verification of these random bytes by the computing device 100 provides protection against replay attacks. Additionally, the AES encryption allows verification of the identities of both the client device 400 and the computing device 100. Upon successful authentication, the client device 400 is granted basic level access to the computing device 100. Thus, at step 4-5 the computing device 100 can receive and execute a command, and at step 4-6 can respond to the command. In the example of the computing device 100 being a parking sensor device 100, upon successful authentication, the client device 400 obtains basic access to the parking sensor device 100 thereby allowing the client device 400 to run basic commands such as device out of Shelf Mode, Calibrate the parking Sensors, Change reporting Intervals, etc.

If the verification at step 4-4 fails (e.g. the random eight bytes generated by the computing device 100 are not properly verified), then at step 4-7 the communication channel is disconnected. Note that steps 4-5 and 4-6 are skipped if the authentication is not successful. Also note that disconnection can also occur if the authentication is not completed within a predetermined timeframe. Also note that all data sizes referenced above (e.g. single byte, eight bytes, sixteen bytes, etc.) are implementation-specific, such that other sizes are possible and are within the scope of the disclosure.

The manner in which the client device 400 is authenticated for the first security level relies on the client device 400 having a device access key for the encryption performed at step 4-3. In some implementations, the device access key is generated when the computing device 100 is provisioned during manufacturing. For example, an ECDH (Elliptic-Curve Diffie-Hellman) protocol can be used to generate the device access key. ECDH allows for secured provisioning of the device access key at the time of manufacturing, wherein information on the device access key is stored on the computing device 100 and made available only to a secured server (e.g. computing device's company server). A security protocol can be kept in place to ensure that no one except the secured server has the device access key. It is pertinent to ensure that third parties (including the computing device's manufacturing site) is not allowed to eavesdrop and obtain the device access key. In some implementations, the device access key generated using ECDH is unique to each computing device 100 and is not accessible or modifiable after it is written/created. However, re-provisioning the computing device 100 is possible which can erase the device access key. The computing device's unique ID (UUID/DevEUI) and the device access key are stored and identified as a pair, so erasing the device access key effectively re-provisions the computing device 100 (similar to new computing device).

Figure 5:
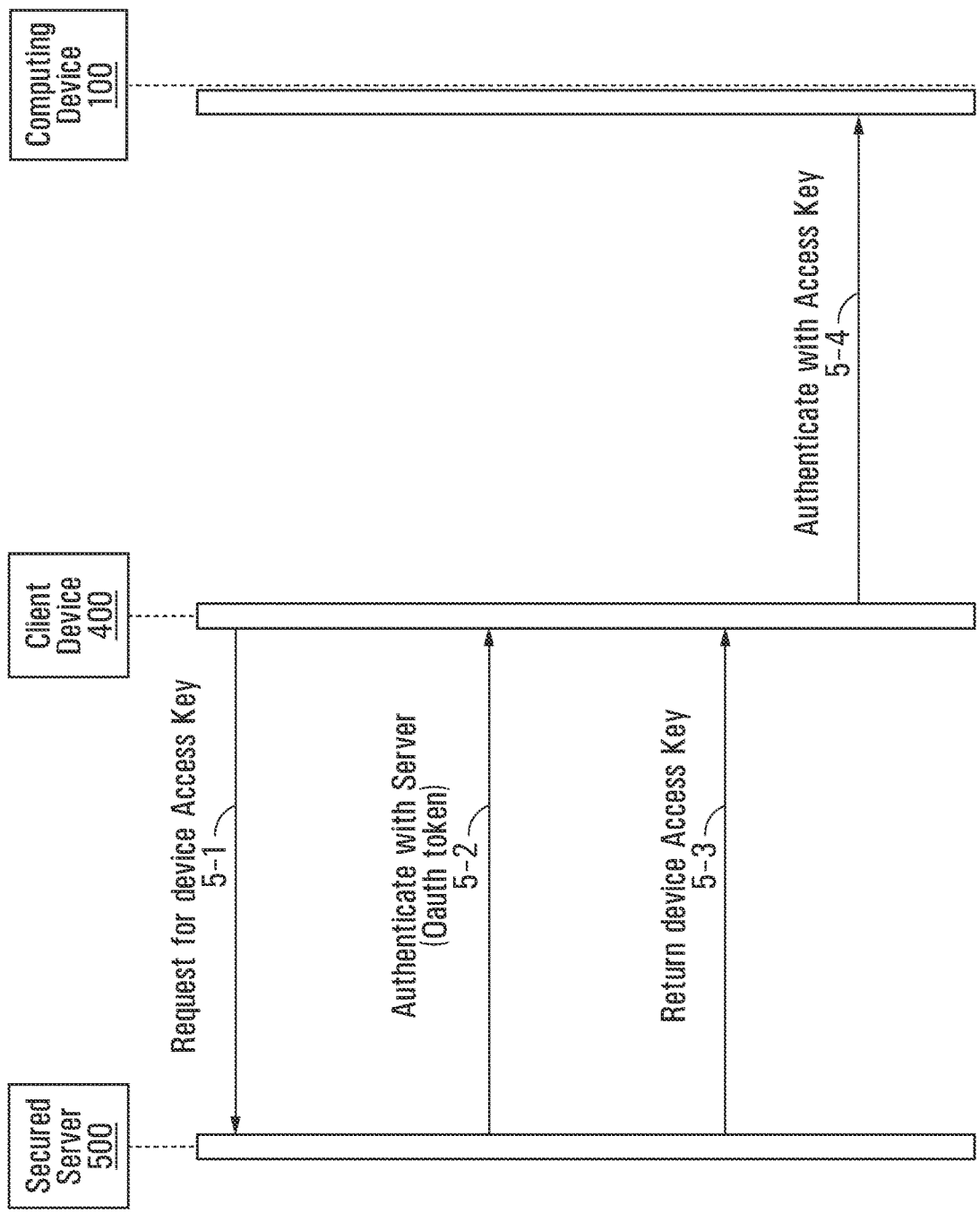
FIG. 5 is a sequence diagram showing how the client device obtains a device key for use with the authentication under the first security level.

Referring now to FIG. 5, shown is a sequence diagram showing how the client device 400 obtains a device access key for use with the authentication under the first security level. This sequence diagram is an example of an OAuth protocol to obtain the device access key. Note that other ways of obtaining the device access key may be employed. At step 5-1, the client device 400 requests the computing device's access key from a secured server 500. At step 5-2, the secured server 500 using OAuth Token protocol authenticates the client device 400. After successful verification, the secured server 500 provides the device access key to the client device 400 at step 5-3. The client device 400 can then use the device access key for authentication purposes at step 5-4, as similarly described above for step 4-3 of FIG. 4.

As mentioned above, the first security level involves the client device 400 authenticating against the secured server 500 before obtaining the device access key. However, if the client device 400 is compromised, others (e.g. cyber-attacker) could obtain the device access key. Hence, while the first security level is suitable for commands where the effects of misconfiguration or tampering are not severe, a higher level of authentication may be prudent for highly restricted commands such as firmware upgrades. After clearing the first security level, the client device 400 only obtains basic level access to the device, and is not allowed to run any restricted commands on the computing device 100. To obtain privileged access rights, the client device 400 would clear a higher security level, without which it cannot provide restricted commands (e.g. firmware upgrades) to the computing device.

To some extent, computing devices are protected against false/wrong firmware commands via code signing and other available protocols. However, an attacker can still attempt to load older versions of pre-signed firmware commands and prevent new bug fixes on a computing device. Therefore, in some implementations, the computing device 100 is configured such that any restricted set of commands are executed only when the client device 400 passes the higher security level. When the client device 400 wishes to run a restricted command on the computing device 100, the computing device 100 will authenticate with a secured server to obtain debug level access rights. In some implementations, before requesting debug level access, the client device 400 should have already passed the first security level process. In other implementations, the client device 400 can request the debug level access without already passing the first security level process.

Authentication: Second Security Level

Figure 6:
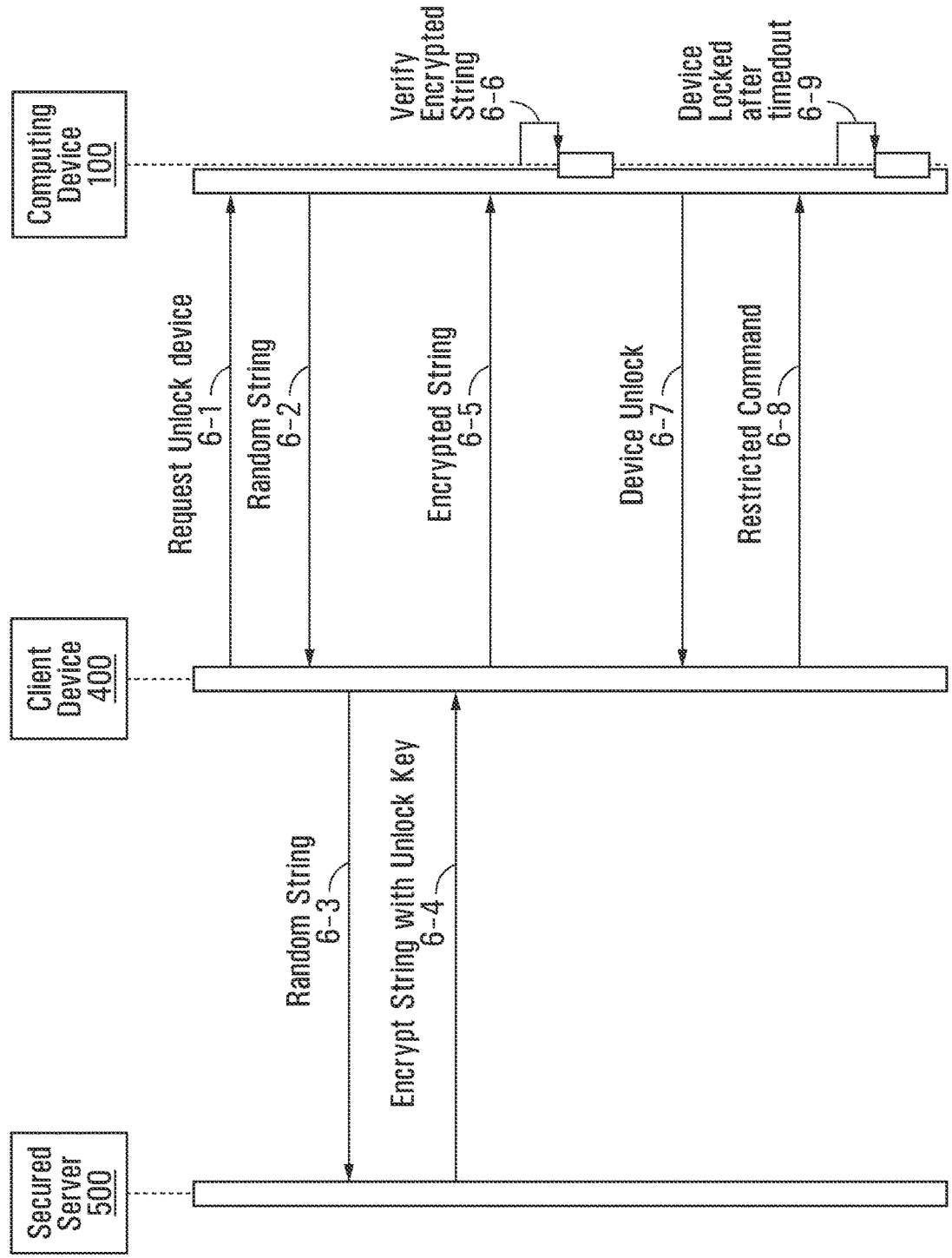
FIG. 6 is a flow chart of a method of managing communication channels.

Referring now to FIG. 6, shown is a sequence diagram showing how a client device 400 is authenticated for a second security level. It is to be understood that this sequence diagram is very specific for exemplary purposes only. In this sequence diagram, the client device 400 has already established a communication channel with the computing device 100. In some implementations, the communication channel is a BLE connection (e.g. Just Works). In other implementations, the communication channel may be established using some other communication protocol. Regardless, the communication channel has link-layer encryption.

The second security level involves end-to-end verification of the client device 400 by the secured server 500. The authentication process involves an unlock key which is generated along with the access key (which is used for first security level) when the computing device 100 is provisioned during manufacturing. Similar to the device access key, the unlock key is protected and stored only on the computing device and the secured server 500. However, unlike the device access key, the unlock key is never sent or shared with the client device 400.

In some implementations, as shown at step 6-1, when the client device 400 wishes to run a restricted command, it requests debug level access from the computing device 100 (i.e. it requests unlocking the computing device). At step 6-2, the computing device 100 generates and transmits a random string to the client device 400. At step 6-3, upon receiving the random string from the computing device 100, the client device 400 passes it along to the secured server 500. At step 6-4, the secured server 500 encrypts the random string using the unlock key and sends the encrypted string to the client device 400. It is noted that, unlike the device access key, the unlock key is not shared directly with the client device 400.

At step 6-5, upon receiving the encrypted string from the secured server 500, the client device 400 passes it along to the computing device 100. At step 6-6, the computing device 100 decrypts the encrypted string using the unlock key and verifies the string. If the string is as expected, the authentication process is successful and debug access rights are granted to the client device 400. In some implementations, at step 6-7, a response is provided to the computing device 100 indicating that the debug access rights are granted. Then, at step 6-8, the client device 400 can run restricted commands on the computing device 100. However, if the authentication is not successful or if there is a timeout after successful authentication, then at step 6-9 the computing device 100 locks itself again. Note that steps 6-7 and 6-8 are skipped if the authentication is not successful. Also note that disconnection can also occur if the authentication is not completed within a predetermined timeframe.

Since debug level access involves verification from the secured server 500 for every session, network access to the secured server 500 may be needed. There could be situations where network access could be an issue, and therefore the debug level access can be restricted to highly sensitive/critical commands which are not frequently used or which can severely impact working of the computing device 100 if compromised. For example, an installer may not have internet access at installation location but may need to run some general-purpose commands on the computing device 100. Therefore, the first security level may be employed for most routine commands, where the client device 400 can be authenticated without internet access using the device access key.

Managing Communication Channels

Figure 7:
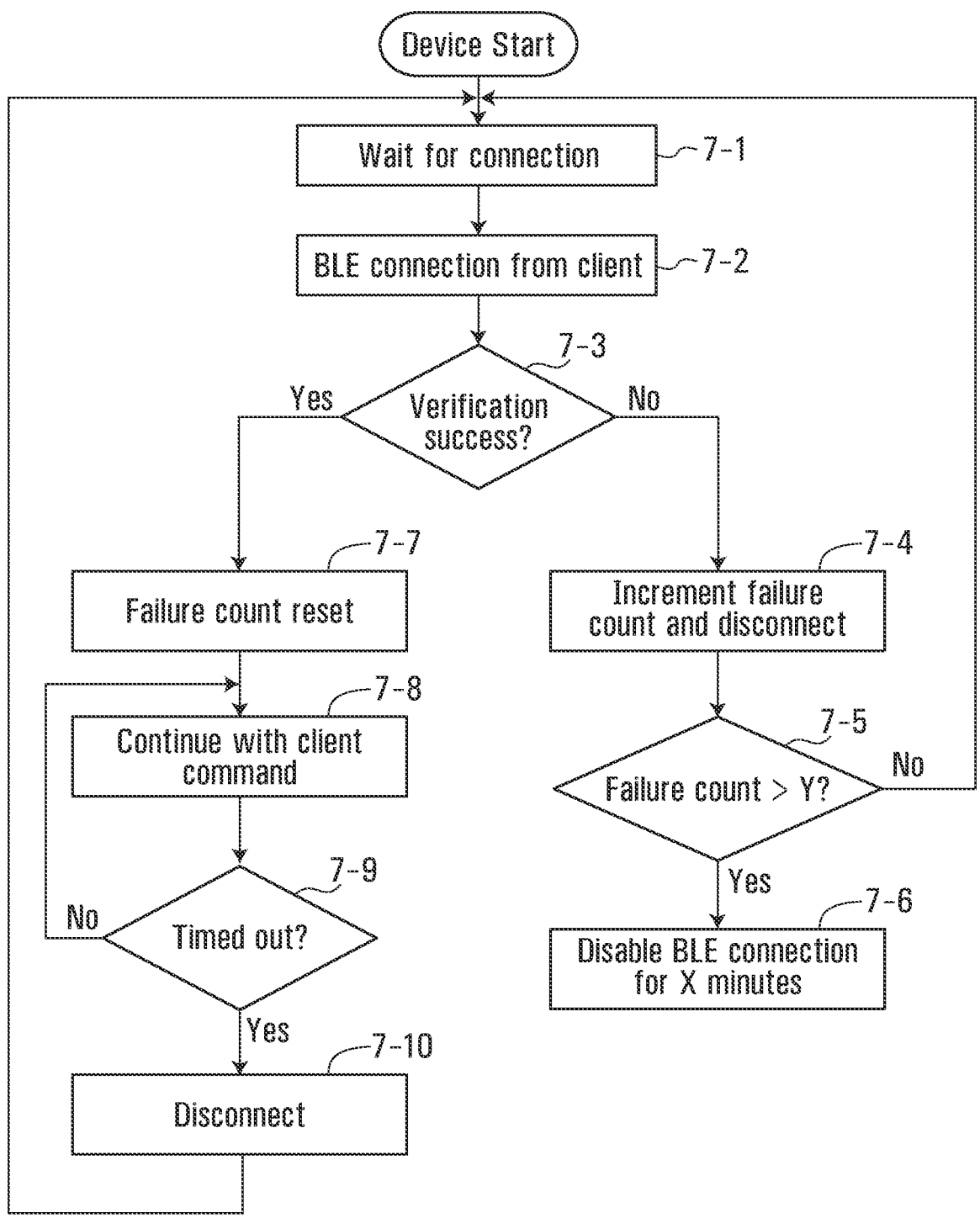
FIG. 7 is a sequence diagram showing how a client device is authenticated for a second security level.

Referring now to FIG. 7, shown is a flow chart of a method of managing communication channels. This method may be executed by a computing device, for example by the control circuitry 104 of the computing device 100 of FIGS. 1 and 2. Although the method of FIG. 7 is described below with reference to the computing device 100 and the client device 110 of FIGS. 1 and 2, it is to be understood that the method of FIG. 7 is applicable to other computing devices and other client devices. In general, the method of FIG. 7 is applicable to any appropriately configured computing device and any appropriately configured client device. It is also to be understood that this method is very specific for exemplary purposes only. Other methods of managing communication channels are possible.

At step 7-1, after a computing device 100 is switched on, it waits for a client device 110 to establish connection. At step 7-2, a communication channel (e.g. BLE connection) is established between the client device 110 and the computing device 100. At step 7-3, upon successful authentication, the client device 110 is granted access (e.g. basic level access) to the computing device 100. The client device 110 can then run commands on the computing device 100 at step 7-8 until the session is completed or timed out at step 7-9 in which case disconnection happens at step 7-10. Moreover, upon successful authentication, a failure count (i.e. a number of failed authentication attempts) is reset at step 7-7. However, if authentication fails at step 7-3, then the client device 110 is disconnected from the computing device 100 and the failure count is incremented at step 7-4. If at step 7-5 the failure count exceeds a predetermined limit Y (e.g. five unsuccessful attempts), then at step 7-6 the communication channel is disabled for a predetermined time X (e.g. ten minutes) and the client device 110 is not allowed to connect to the computing device 100 during that period. In some implementations, the predetermined limit Y and the predetermined time X are configurable.

In some implementations, the method can be configured to restrict access permanently or for an extended period of time. For example, after several failed attempts (e.g. 15 unsuccessful attempts), access can be denied permanently or restricted for an extended period of time (e.g. 24 hours) before allowing another attempt.

Parking Sensor Device

Figure 8:
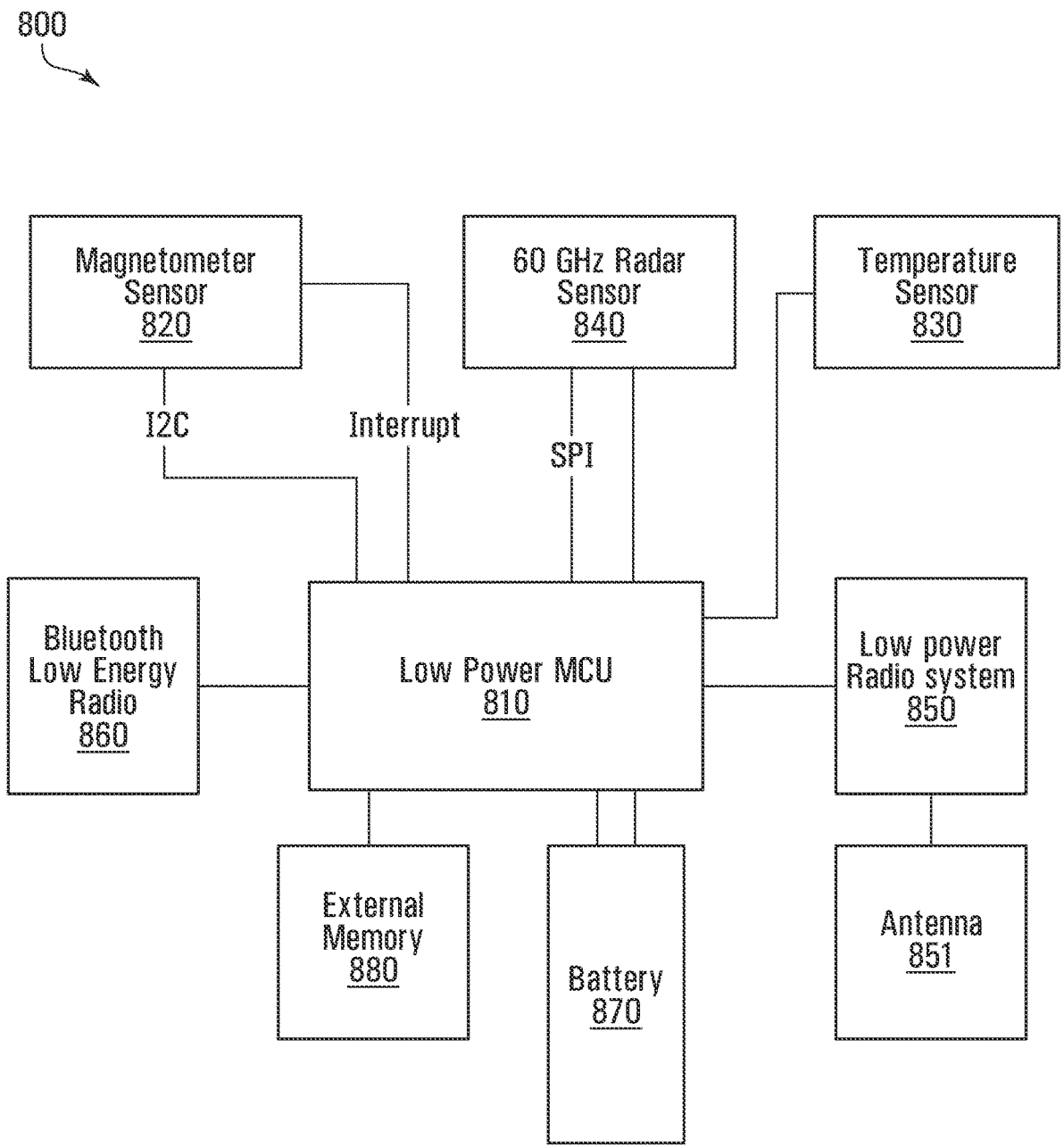
FIG. 8 is a block diagram of another computing device, specifically a parking sensor device.

Referring now to FIG. 8, shown is a block diagram of another example computing device 800, specifically a parking sensor device 800. It is to be understood that the parking sensor device 800 is very specific and is provided merely as an example. Other computing devices such as IoT devices (e.g. wearable devices, blood pressure monitors, public transportation devices, etc.) are possible and are within the scope of the disclosure.

Similar to the computing device 100 of FIGS. 1 and 2, the parking sensor device 800 of FIG. 8 has control circuitry 810 (i.e. a low-power MCU) and a communication interface 860 (i.e. a BLE radio) for communicating with client devices. In some implementations, when software stored on external memory 880 is executed by the low-power MCU 810, the software configures the low-power MCU 810 to implement methods described herein. The low-power MCU 810 would control the BLE radio 860 in this regard.

In addition, the parking sensor device 800 has a magnetometer sensor 820, a temperature sensor 830, a 60 Ghz radar sensor 840, a low-power long-range radio 850, a battery 870, external memory 880, and may have other components that are not specifically shown. The magnetometer sensor 820, the 60 Ghz radar sensor 840, and/or the temperature sensor 830 can be used to sense presence or absence of a vehicle in a defined area such as a parking space. The low-power long-range radio 850 is coupled to an antenna 851 and is used to communicate with a wireless network.

According to an embodiment of the disclosure, there is provided a non-transitory computer readable medium having recorded thereon statements and instructions that, when executed by a processor 104 or an MCU 810 of a computing device 100 and 800, implement a method as described herein. The non-transitory computer readable medium can be the external memory 880 of the parking sensor device 800 shown in FIG. 8, or some other non-transitory computer readable medium. Other examples include an SSD (Solid State Drive), a hard disk drive, a CD (Compact Disc), a DVD (Digital Video Disc), a BD (Blu-ray Disc), a memory stick, or any appropriate combination thereof.

It is noted that non-software implementations are possible and are within the scope of this disclosure. Other implementations can include additional or alternative hardware components, such as any appropriately configured FPGA (Field-Programmable Gate Array) and/or ASIC (Application-Specific Integrated Circuit), for example. More generally, the control circuitry 104 and 810 of the computing device 100 and 800 can be implemented with any suitable combination of hardware, software and/or firmware.

Numerous modifications and variations of the present disclosure are possible in light of the above teachings. It is therefore to be understood that within the scope of the appended claims, the disclosure may be practised otherwise than as specifically described herein.

We claim:

1. A method for execution by a computing device, comprising:
    establishing a communication channel for communicating with a client device using link-layer encryption;
    receiving an authentication request from the client device over the communication channel;
    attempting to authenticate the client device using authentication-layer encryption on top of the link-layer encryption;
    receiving a command from the client device over the communication channel;
    determining a security level being requested out of a plurality of possible security levels based on the authentication request, wherein the plurality of possible security levels comprises a first security level for routine commands and a second security level for restricted commands; and
    if the client device has been authenticated, executing the command.

2. The method of claim 1, wherein attempting to authenticate the client device using authentication-layer encryption comprises:
    transmitting random data over the communication channel to the client device;

receiving encrypted data over the communication channel from the client device;

decrypting the encrypted data using an encryption key to produce raw data; and verifying that the raw data includes the random data that was sent to the client device in which case the client device is authenticated.

3. The method of claim 2, wherein the random data is transmitted in response to the authentication request.

4. The method of claim 3, wherein the random data that is sent to the client device is based on the security level being requested.

5. The method of claim 4, wherein:

when the authentication request is for the first security level, the random data sent to the client device comprises eight bytes of random data for encryption by the client device itself; and when the authentication request is for the second security level, the random data sent to the client device comprises a string of random data for encryption by a secured server.

6. The method of claim 1, further comprising:

upon authenticating the client device, transmitting a response to the client device confirming access to the computing device.

7. The method of claim 1, further comprising:

upon executing the command, transmitting a response to the client device confirming the execution and/or indicating a result of the execution.

8. The method of claim 1, further comprising:

upon attempting to authenticate the client device, if the client device could not be authenticated, disconnecting the communication channel.

9. The method of claim 8, further comprising:

disabling the communication channel for a defined time period if there is a defined number of unsuccessful sequential attempts to authenticate the client device.

10. The method of claim 1, further comprising:

upon expiry of a timeout period in which no command is received from the client device, disconnecting the communication channel.

11. The method of claim 1, wherein the communication channel having link-layer encryption comprises a BLE (Bluetooth Low Energy) connection.

12. The method of claim 11, wherein establishing the BLE connection comprises pairing with Just Works.

13. The method of claim 1, wherein the computing device comprises an IoT device.

14. The method of claim 13, wherein the IoT device comprises a parking sensor device.

15. A non-transitory computer readable medium having recorded thereon statements and instructions that, when executed by a processor or an MCU (Microcontroller Unit) of a computing device, implement a method, the method comprising:

establishing a communication channel for communicating with a client device using link-layer encryption;

receiving an authentication request from the client device over the communication channel;

attempting to authenticate the client device using authentication-layer encryption on top of the link-layer encryption;

receiving a command from the client device over the communication channel;

determining a security level being requested out of a plurality of possible security levels based on the authentication request, wherein the plurality of possible security levels comprises a first security level for routine commands and a second security level for restricted commands; and if the client device has been authenticated, executing the command.

16. A computing device, comprising:

a communication interface; and control circuitry coupled to the communication interface and configured to implement a method, the method comprising:

establishing a communication channel for communicating with a client device using link-layer encryption;

receiving an authentication request from the client device over the communication channel;

attempting to authenticate the client device using authentication-layer encryption on top of the link-layer encryption;

receiving a command from the client device over the communication channel;

determining a security level being requested out of a plurality of possible security levels based on the authentication request, wherein the plurality of possible security levels comprises a first security level for routine commands and a second security level for restricted commands; and if the client device has been authenticated, executing the command.

17. The computing device of claim 16, wherein the computing device comprises an IoT device.

18. The computing device of claim 17, wherein the IoT device comprises a parking sensor device.

19. The computing device of claim 16, wherein the communication interface comprises a BLE (Bluetooth Low Energy) radio, and the circuitry comprises an MCU (Microcontroller Unit).

* * * * *